United States Patent
Liang et al.

(10) Patent No.: US 9,755,222 B2
(45) Date of Patent: Sep. 5, 2017

(54) ALKALI METAL OXYANION ELECTRODE MATERIAL HAVING A CARBON DEPOSITED BY PYROLYSIS AND PROCESS FOR MAKING SAME

(71) Applicant: JOHNSON MATTHEY PUBLIC LIMITED COMPANY, London (GB)

(72) Inventors: Guoxian Liang, Saint-Hyacinthe (CA); Steeve Rousselot, Montreal (CA); Jasmin Dufour, Longueuil (CA)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/198,856

(22) Filed: Mar. 6, 2014

(65) Prior Publication Data

US 2014/0272588 A1 Sep. 18, 2014

Related U.S. Application Data

(60) Provisional application No. 61/787,490, filed on Mar. 15, 2013.

(51) Int. Cl.
| | |
|---|---|
| H01M 4/36 | (2006.01) |
| H01M 4/04 | (2006.01) |
| H01M 4/58 | (2010.01) |
| H01M 4/62 | (2006.01) |
| H01M 4/136 | (2010.01) |
| H01M 4/1397 | (2010.01) |
| H01M 4/133 | (2010.01) |
| H01M 4/587 | (2010.01) |
| H01M 10/0525 | (2010.01) |

(52) U.S. Cl.
CPC ....... H01M 4/0471 (2013.01); H01M 4/0428 (2013.01); H01M 4/133 (2013.01); H01M 4/136 (2013.01); H01M 4/1397 (2013.01); H01M 4/366 (2013.01); H01M 4/587 (2013.01); H01M 4/5825 (2013.01); H01M 4/625 (2013.01); H01M 10/0525 (2013.01)

(58) Field of Classification Search
CPC ..................................................... H01M 4/36
See application file for complete search history.

(56) References Cited

U.S. PATENT DOCUMENTS

| | | | |
|---|---|---|---|
| 6,855,273 B2 | 2/2005 | Ravet | |
| 7,285,260 B2 | 10/2007 | Armand et al. | |
| 7,601,318 B2 | 10/2009 | Armand et al. | |
| 7,632,317 B2 | 12/2009 | Belharouak | |
| 8,668,842 B2 | 3/2014 | Liang et al. | |
| 2003/0207178 A1* | 11/2003 | Hu | H01M 4/0428 429/232 |
| 2007/0152185 A1 | 7/2007 | Gauthier et al. | |
| 2009/0297952 A1* | 12/2009 | Yasunaga | C01B 31/02 429/231.8 |
| 2010/0032345 A1* | 2/2010 | Cross | C10G 25/00 208/251 R |
| 2010/0310936 A1 | 12/2010 | Ohira | |
| 2010/0323245 A1 | 12/2010 | Liang | |
| 2011/0064980 A1 | 3/2011 | Ohira | |
| 2012/0003537 A1 | 1/2012 | Ohira et al. | |
| 2012/0028121 A1 | 2/2012 | Gauthier et al. | |
| 2012/0070708 A1 | 3/2012 | Ohira | |
| 2012/0138867 A1 | 6/2012 | Liang et al. | |
| 2012/0244443 A1 | 9/2012 | Ohira et al. | |
| 2012/0328774 A1* | 12/2012 | Liang et al. | 427/122 |
| 2013/0040198 A1 | 2/2013 | Patoux et al. | |
| 2013/0209886 A1 | 8/2013 | Ohira et al. | |

FOREIGN PATENT DOCUMENTS

| | | | | |
|---|---|---|---|---|
| CA | WO2008067677 | * | 6/2008 | .............. H01M 4/58 |
| CA | 2307119 | | 7/2009 | |
| WO | 2007100918 | | 9/2007 | |
| WO | 2012013685 | | 2/2012 | |

OTHER PUBLICATIONS

P. Balaz, Mechanochemistry in Nanoscience and Minerals Engineering, Chapter 2, Springer-Verlag Berlin Heidelberg 2008.
Tomasi et al., Cerâmica vol. 44 n. 289 São Paulo Sep./Oct. 1998.
Am. Cer. Soc. Bull., 65, 1591, 1986.
Maier et al. [Defect Chemistry of LiFePO4, Journal of the Electrochemical Society, 155, 4, A339-A344, 2008].
Nazar et al. [Proof of Supervalent Doping in Olivine LiFePO4, Chemistry of Materials, 2008, 20 (20), 6313-6315].
Hu and al. (Journal of Central South University of Technology, (2008), 15, pp. 531-534).
Xiao and al (Chinese Chemical Letters, (2007), 18, pp. 1525-1527).
De Castro and Mitchell, Synthesis, Functionalization and surface treatment of nanoparticles, Chapter 1, American Scientific Publishers 2002.
Zhang et al., "Effect of milling method and time on the properties and electrochemical performance of LiFePO4/C composites prepared by ball milling and thermal treatment", Electrochimica Acta 55 (2010) 2653-2661.
Yasunaga et al., "Novel Synthesis Process of LiFePO4/C Composite Positive Active Material for Li-ion Cells", Abstract #390, The 15th (Continued)

*Primary Examiner* — Alex Usyatinsky
(74) *Attorney, Agent, or Firm* — Young & Thompson

(57) ABSTRACT

An alkali metal oxyanion cathode material comprising particles, where the particles carry, on at least a portion of the particle surface, carbon deposit by pyrolysis is described. The particles have the general formula A:M:M':XO4 where the average valency of M is +2 or greater; A is at least one alkali metal selected from Li, Na and K; M is at least Fe and/or Mn; and M' is a metal of valency of 2+ or more.

13 Claims, No Drawings

(56) References Cited

OTHER PUBLICATIONS

International Meeting on Lithium Batteries—IMLB 2010, The Electrochemical Society.

* cited by examiner

ALKALI METAL OXYANION ELECTRODE MATERIAL HAVING A CARBON DEPOSITED BY PYROLYSIS AND PROCESS FOR MAKING SAME

CROSS REFERENCE TO RELATED APPLICATIONS

The present application hereby claims the benefit of the provisional patent application Ser. No. 61/787,490, filed on Mar. 15, 2013, the disclosure of which is hereby incorporated by reference in its entirety.

BACKGROUND OF THE INVENTION

Field of the Invention

The present invention relates to the field of electrode materials, and more specifically, to an alkali metal oxyanion electrode material having a carbon deposited by pyrolysis, as well as to a process for making same.

Description of Related Art

Positive electrodes of lithium-ion battery generally comprise an electrochemically active cathode material, a binder and carbon particles which act as an electronically conductive additive. During battery cycling, it has been observed that such positive electrodes generally show a deleterious increase in electrode resistance. It has been proposed that as the number of cycles increases, the cathode material exhibits unit lattice volume expansion/shrinkage variations that are due to insertion/deinsertion of alkali cation in the cathode material. It is believed that these variations induce a loss of electronically conductive network contact with the cathode material and/or breaking of cathode material particles. As a result, the battery's capacity decreases and the battery has a resulting shorter life span.

WO 2009/096255 describes a cathode material of general formula $Li_yK_aFe_{1-x}X_xPO_4$ with reduced change of the unit cell volume, where X represents at least one element selected from group 2 to 13 elements; $0<a\leq 0.25$ and $0\leq x\leq 0.25$; and y is $(1-a)$. The Li site is partially substituted with at least K to prevent a volume change from occurring due to Li desorption. The percentage change of the unit lattice volume is 4% or less.

WO 2010/134579 describes an alkali metal phosphosilicate cathode material of general formula $LiFe_{1-x}M_xP_{1-y}Si_yO_4$ where the average valence of Fe is +2 or greater; M is an element having a valence of +2 or greater and is at least one selected from the group consisting of Zr, Sn, Y and Al; the valence of M and the average valence of Fe are different; $0<x\leq 0.5$; and $y=x\cdot(\{valence\ of\ M\}-2)+(1-x)(\{average\ valence\ of\ Fe\}-2)$.

JP 2011/077030 describes an alkali metal phosphosilicate material of general formula $Li_{(1-a)}A_aFe_{(1-x-b)}M_{(x-c)}P_{(1-y)}Si_yO_4$, where A is at least one kind selected from a group consisting of Na, K, Fe and M. Average valence of Fe is +2 or more, M is an element of valence of +2 or more, and at least one kind selected from the group consisting of Zr, Sn, Y and Al, the average valence of M and the average valence of Fe are different from each other, and where $0<a\leq 0.125$, $0<x\leq 0.5$, and $0<y\leq 0.5$. The volume change of the unit cell is 5% or less.

WO 2012/061934 describes an alkali metal phosphosilicate cathode material comprising particles which carry, on at least a portion of their surface, carbon deposited by pyrolysis, where the particles have a general formula $AM_{1-x}M'_xP_{1-y}Si_yO_4$ where the average valence of M is +2 or greater; M is Fe and/or Mn; and A is at least one alkali metal selected from Li, Na and K. Optionally, the Fe and/or Mn is substituted by at most 15% at. of one or more metal at oxidation levels between +1 and +5. M' is a metal of valence of 2+ or more. The x, y and z are defined as follows: $0<x\leq 0.25$; and $y=x\cdot(\{valence\ of\ M'\}-2)+(1-x)\cdot(\{average\ valence\ of\ M\}-2)$. WO 2012/061934 also describes a two-step process for making this material. The process includes a first dry high-energy milling step of precursors of the carbon-deposited alkali metal phosphosilicate cathode material which step is performed prior to a first solid-state thermal reaction, and a second dry high-energy milling step on a product of the first thermal reaction which second step is performed prior to a second solid-state thermal reaction.

SUMMARY OF THE INVENTION

There is a need for cathode materials having increased capacity and that still retain the characteristic of having reduced unit lattice volume expansion/shrinkage variations. There is also a need for an alternative process for making a cathode material having reduced unit lattice volume expansion/shrinkage variations, which in the context of an implementation at an industrial scale presents less technical challenges relatively to the process described in WO 2012/061934 (e.g., which presented relatively low production unit throughput, higher production cost, etc. likely due to the requirement of having to perform two high-energy milling steps).

In one non-limiting broad aspect, the present invention relates to an alkali metal oxyanion cathode material comprising particles, where the particles carry, on at least a portion of the particle surface, carbon deposit by pyrolysis. The particles have the general formula $A:M:M':XO_4$ where the average valency of M is +2 or greater; A is at least one alkali metal selected from Li, Na and K; M is at least Fe and/or Mn; and M' is a metal of valency of 2+ or more. Optionally, the Fe and/or Mn is substituted by at most 15% at. of one or more metal at oxidation levels between +1 and +5. In one non-limiting embodiment, the elements in the general formula $A:M:M':XO_4$ have the following general ratios 1:0.95-0.98:0.02 to <0.05:1. In one non-limiting embodiment, the M' is present at a general ratio of from 0.02 to ≤0.04 or from 0.02 to ≤0.03. In one non-limiting embodiment, the $XO_4$ is $PO_4$ and/or $SiO_4$, and can be partly substituted by another $XO_4$, in which X is either P, S, V, Si, Nb, Mo or any combinations thereof.

In another non-limiting broad aspect, the present invention relates to a process for the synthesis of an alkali metal oxyanion cathode material comprising particles, where the particles carry, on at least a portion of the particle surface, carbon deposit by pyrolysis. The process comprises performing a thermal step of high-energy milled precursors of the cathode material, where at least a part of the thermal step is performed under an atmosphere comprising a carbonaceous chemical and/or an organic chemical comprising carbon.

These and other aspects and features of the present invention will now become apparent to those of ordinary skill in the art upon review of the following description of specific embodiments of the invention in conjunction.

DESCRIPTION OF ILLUSTRATIVE EMBODIMENTS

The present inventors have surprisingly and unexpectedly discovered that the herein described cathode materials exhibit reduced change of the unit cell (lattice) volume concomitant to alkali cation insertion/deinsertion. The present inventors have also surprisingly and unexpectedly discovered that the herein described process can be used to make cathode materials that exhibit reduced change of the unit cell (lattice) volume concomitant to alkali cation insertion/deinsertion.

In one non-limiting embodiment, the herein described reduction of the unit cell (lattice) volume change can be characterized by the volume change of the de-cationated (e.g. delithiated) product versus the cationated (e.g. lithiated) product. In one non-limiting embodiment, the unit (lattice) volume of a cathode material can be evaluated by an XRD measurement of the cathode material. Accordingly, the present inventors have measured the increase in unit (lattice) cell volume of a given cathode material relatively to the unit (lattice) cell volume of C—$LiFePO_4$ as a parameter to evaluate the performance of a material and/or of a process for making same. For example, a cathode material with an unsuitable increase in unit cell volume was characterized as representing a cathode material of low purity and/or inadequate substitution and/or presence of the M' in the oxyanion matrix.

In one non-limiting embodiment, the herein described process comprises a thermal step performed on high-energy milled precursors of an alkali metal oxyanion cathode material, where at least a part of the thermal step is performed under a gaseous or vaporous atmosphere comprising a carbonaceous chemical and/or an organic chemical comprising carbon.

In one non-limiting embodiment, the herein described precursors also include an organic material as a source of carbon for forming the herein described carbon deposited by pyrolysis.

Surprisingly and unexpectedly, the inventors have found that the herein described process produces a cathode material having a reduced surface area (BET in $m^2/g$) relative to a comparative cathode material obtained with an identical process but performed in the absence of a gaseous or vaporous atmosphere comprising a carbonaceous chemical and/or an organic chemical comprising carbon.

In one non-limiting embodiment, the herein described gaseous or vaporous atmosphere is also optionally humidified.

In one non-limiting embodiment, the herein described thermal step is performed in a chemical reactor that comprises a zone fed by an external flow of gas and/or vaporous atmosphere comprising a carbonaceous chemical and/or an organic chemical comprising carbon.

In one non-limiting embodiment, the herein described carbonaceous chemical comprises a decomposition product of an organic compound comprising carbon.

In one non-limiting embodiment, the herein described carbonaceous chemical refers to a compound having at least 40 wt. % of carbon, for example but without being limited thereto, methanol, isopropanol, butanol, etc. The person skilled in the art can use an alternative carbonaceous chemical without departing from the invention.

In one non-limiting embodiment, the herein described process includes a step of pyrolysis of an organic source of carbon for obtaining a carbon deposit by pyrolysis onto the alkali metal oxyanion, and/or on its precursors. In one non-limiting embodiment, the pyrolysis is performed during the herein described thermal step. In another non-limiting embodiment, an optional flash pyrolysis is performed after the thermal step to improve carbon deposit graphitization. The optional flash pyrolysis may be performed immediately after the thermal step or may be performed later.

In one non-limiting embodiment, the herein described chemical reactor comprises a "zone," where the "zone" refers to a portion, including a plurality of portions of the chemical reactor. In another embodiment, the herein described chemical reactor "zone" refers to substantially the whole of the chemical reactor.

In one non-limiting embodiment, the herein described alkali metal oxyanion cathode material is a phosphosilicate-based material.

In one non-limiting embodiment, the deposit of carbon can present a more or less uniform, adherent and non-powdery deposit. In one non-limiting embodiment, the carbon deposit represents up to 15% by weight, with respect to the total weight of the material. In another non-limiting embodiment, the carbon deposit represents from 0.5 to 5% by weight with respect to the total weight of the material. Deposition of carbon by pyrolysis of a carbon source can be performed on the cathode material and/or on its precursors as described, for instance, in WO 02/027824, WO 02/027823, CA 2,307,119, and WO 2011/072397, as well as in US 2002/195591 and US 2004/157126, which are incorporated herein by reference in their entirety.

In one non-limiting embodiment, performed at an industrial scale, the herein described process can be carried out continuously or in batch, in a reactor selected from rotary kilns, push kilns, fluidized beds, belt-driven kilns, that allow control of the composition and the circulation of the gaseous atmosphere. Utilization of large batch kiln, such as baking kiln, is not excluded. The person skilled in the art will be able to identify any alternative suitable alternative reactors or any from the above without departing from the invention.

In another non-limiting embodiment, the herein described process further comprises, prior to the thermal step, performing a high-energy milling step of the alkali metal oxyanion cathode material precursors.

In another non-limiting embodiment, an organic source of carbon is also present during the herein described high-energy milling step, where the organic source of carbon is for obtaining the carbon coating deposited by pyrolysis.

In the art of mechanochemistry, the term "high-energy milling" is usually used in order to stress the character of applied milling equipments (mills) used for preparation of micro- and nano-sized solids. (See, e.g., P. Balaz, Mechanochemistry in Nanoscience and Minerals Engineering, Chapter 2, Springer-Verlag Berlin Heidelberg 2008; De Castro and Mitchell, Synthesis, Functionalization and surface treatment of nanoparticles, Chapter 1, American Scientific Publishers 2002; Zoz, Ren, Reichardt and Benz, High Energy Milling/Mechanical Alloying/Reactive Milling, Zoz GmbH, available on Zoz website). High-energy milling can be performed with a large choice of equipments, for example but without any limitation, high-energy ball mills, pulverizing mixer mills, planetary ball mills, drum/ball-mills, shaker mills, stirred ball mills, mixer ball mills, vertical and horizontal attritors, and equivalent milling equipments. The person skill in the art is able to identify suitable equipments without undue experimentation and without departing from the invention. High-energy milling equipments are commercially available, for example but without any limitation, from SPEX CertiPrep Group L.L.C. (8000M Mixer/Mill®, etc.), Zoz GmbH (Simoloyer®), Retsch GmbH (Planetary Ball Mill PM 200/400/400 MA) and Union Process Inc. (Attritor®).

In one non-limiting embodiment, the high-energy milling equipment can be selected to avoid contamination of reactants, especially metallic contamination. To perform metal-free grinding, milling parts of the equipment are preferably made of ceramics, or coated with ceramics, for example, without any limitation, alumina, zirconium silicate, zirconia, yttria or ceria stabilized zirconia, silicium nitride, tungsten carbide or silicium carbide. The person skill in the art is able to identify any alternative suitable milling parts of the equipment or any from the above without departing from the invention.

In one non-limiting embodiment, high-energy milling is a high-energy ball milling.

In one non-limiting embodiment, high-energy milling is a dry high-energy milling.

In one non-limiting embodiment, the herein described thermal step is operated at a temperature selected from the following temperature ranges of between about 400° C. and about 800° C., about 450° C. and about 800° C., about 500° C. and about 800° C., about 525° C. and about 800° C., about 550° C. and about 800° C., or about 575° C. and about 800° C., or about 600° C. and about 800° C., or about 400° C. and about 700° C., or about 450° C. and about 650° C., or about 500° C. and about 600° C. The person skilled in the art will be able to select any alternative suitable temperature or any temperature falling within any of the ranges above without departing from the invention.

In one non-limiting embodiment, high-energy milling can be performed during a time period selected from the following time ranges of between about 5 minutes to about 4 hours, about 10 minutes to about 4 hours, about 30 minutes to about 4 hours, about 60 minutes to about 4 hours, about 90 minutes to about 4 hours, about 120 minutes to about 4 hours, about 150 minutes to about 4 hours, about 180 minutes to about 4 hours, about 210 minutes to about 4 hours, or about 230 minutes to about 4 hours. The person skilled in the art will be able to select any alternative suitable time period or any time period falling within any of the ranges above without departing from the invention.

In one non-limiting embodiment, the herein described optional flash thermal treatment can be operated at a temperature selected from the following temperature ranges of between about 650° C. and about 900° C., about 700° C. and about 900° C., about 750° C. and about 900° C., about 800° C. and about 900° C., or about 825° C. and about 900° C., or about 850° C. and about 900° C. The person skilled in the art will be able to select any alternative suitable temperature or any temperature falling within any of the ranges above without departing from the invention.

The optional flash thermal treatment can be operated during a period of time selected from the following time ranges of between about 10 seconds and about ten minutes, about 30 seconds and about ten minutes, about one minute and about ten minutes, about two minutes and about ten minutes, about three minutes and about ten minutes, about four minutes and about ten minutes, or about five minutes and about ten minutes. The person skilled in the art will be able to select any alternative suitable time period or any time period falling within any of the ranges above without departing from the invention.

In one non-limiting embodiment, in the context of an alkali metal phosphosilicate having a carbon deposit, the herein described precursors comprise:
a) at least one source compound of an alkali metal;
b) at least one source compound of a metal M selected from Fe and/or Mn;
c) at least one source compound of a metal M', where M' in the final product is a 2+ or more metal;
d) at least one source compound of P, if the element P is not present in another source compound;
e) at least one source compound of Si, if the element Si is not present in another source compound; and
f) at least one source compound of carbon.

In one non-limiting embodiment the source compound b) is partially replaced by at most 15% of: one or more other metals selected from Ni and Co, and/or atoms of one or more aliovalent or isovalent metals other than Ni or Co, and/or atoms of Fe(III).

In another non-limiting embodiment the source compound b) is partially replaced by at most 15% of: one or more other metals chosen from Ni and Co, and/or by one or more aliovalent or isovalent metals selected from the group consisting of Mg, Mo, Mn, V, Pb, Sn, Nb, Ti, Al, Ta, Ge, La, Y, Yb, Cu, Ag, Sm, Ce, Hf, Cr, Zr, Bi, Zn, Ca, B and W, and/or atoms of Fe(III).

As used herein, the "one or more metal" is readily understood by the person skilled in the art as being one or more metal of those metals which are suitable in the art of batteries. For example, but without being limited thereto, the "one or more metal" described herein may be selected from any metal included in the 2, 3, 4, 5, or 6 periods from the periodic table that are suitable in the art of batteries without departing from the invention. In another example, but without being limited thereto, the "one or more metal" described herein may be selected from at least one element selected from group 2 to 13 elements. In another example, but without being limited thereto, the "one or more metal" described herein may be selected from Mg, Mo, Mn, V, Co, Ni, Pb, Sn, Nb, Ti, Al, Ta, Ge, La, Y, Yb, Cu, Ag, Sm, Ce, Hf, Cr, Zr, Bi, Zn, Ca, B and W. The person skilled in the art will be able to select any alternative suitable "one or more other metal" or any from the above without departing from the invention.

In one non-limiting embodiment, the source compound a) is an alkali compound selected, for example, from the group consisting of lithium oxide, sodium oxide, lithium hydroxide, sodium hydroxide, potassium hydroxide, lithium carbonate, sodium carbonate, potassium carbonate, $Li_3PO_4$, $Na_3PO_4$, $K_3PO_4$, the hydrogen phosphate $LiH_2PO_4$, $LiNaHPO_4$, $LiKHPO_4$, $NaH_2PO_4$, $KH_2PO_4$, $Li_2HPO_4$, lithium, sodium or potassium ortho-, meta- or polysilicates, lithium sulfate, sodium sulfate, potassium sulfate, lithium oxalate, sodium oxalate, potassium oxalate, lithium acetate, sodium acetate, potassium acetate and one of their mixtures. The person skilled in the art will be able to select any alternative suitable source compound a) or any from the above without departing from the invention.

In one non-limiting embodiment, the source compound b) comprise a compound selected, for example, from iron, iron(III) oxide or magnetite, trivalent iron phosphate, lithium iron hydroxyphosphate or trivalent iron nitrate, ferrous phosphate, hydrated or nonhydrated, vivianite $Fe_3(PO_4)_2$, iron acetate $(CH_3COO)_2Fe$, iron sulfate $(FeSO_4)$, iron oxalate, iron(III) nitrate, iron(II) nitrate, $FeCl_3$, $FeCl_2$, FeO, ammonium iron phosphate $(NH_4FePO_4)$, $Fe_2P_2O_7$, ferrocene or one of their mixtures; and/or manganese, MnO, $MnO_2$, manganese acetate, manganese oxalate, Mn(III) acetylacetonate, Mn(II) acetylacetonate, Mn(II) chloride, $MnCO_3$, manganese sulfate, manganese nitrate, manganese phosphate, manganocene or one of their mixtures. The person skilled in the art will be able to select any alternative suitable source compound b) or any from the above without departing from the invention.

In one non-limiting embodiment, the source compound c) is a source compound of a metal which in the final product is a metal having a valency of 2+ or more. For example, it is a source compound of a metal selected from the group consisting of $Zr^{4+}$, $Ti^{4+}$, $Nb^{4+}$, $Get$ $Ce^{4+}$ and $Sn^{4+}$, and/or a source compound a metal selected from the group consisting of $Al^{3+}$, $Y^{3+}$, $Nb^{3+}$, $Ti^{3+}$, $Ga^{3+}$, $Cr^{3+}$ and $V^{3+}$, and/or a source compound a metal selected from the group consisting of $Ta^{5+}$ and $Nb^{5+}$, and/or a source compound a metal selected from the group consisting of $Zn^{2+}$ and $Ca^{2+}$ For example, in the specific case of a source compound of a valency 2+, the source compound c) may be selected from zinc acetate, zinc chloride, zinc acetylacetonate, zinc nitrate, zinc sulfate, zinc stearate, calcium carbonate, calcium hydroxide, calcium acetate, or a mixture thereof. For example, in the specific case of a source compound of valency 3+, the source compound c) may be selected from yttrium(III) 2-ethylhexanoate, yttrium(III) acetate, yttrium(III) acetylacetonate, yttrium(III) nitrate, aluminum acetate, aluminum isopropoxide, aluminum acetylacetonate, aluminum ethoxide, aluminum metaphosphate, aluminum monostearate, or a mixture thereof. For example, in the specific case of a source compound of valency 4+, the source compound c) may be selected from zirconium acetate hydroxide, zirconium alkoxide, zirconium(IV) acetylacetonate, zirconium(IV) ethoxide, zirconium(IV) hydrogenphosphate, zirconium(IV) silicate, titanium(IV) 2-ethylhexyloxide, titanium(IV) butoxide, germanium(IV) ethoxide, tin(IV) acetate, or a mixture thereof. For example, in the specific case of a source compound of valency 5+, the source compound c) may be selected from tantalum(V) butoxide, niobium(V) ethoxide, niobium(V) phenoxide, or a mixture thereof. The person skilled in the art will be able to select any alternative suitable source compound c) or any from the above without departing from the invention.

In one non-limiting embodiment, the source compound d) is a compound of phosphorus selected, for example, from phosphoric acid and its esters, $M_3PO_4$ wherein M is at least one selected from Li, Na and K, the hydrogen phosphate $MH_2PO_4$ wherein M is at least one selected from Li, Na and K, monoammonium or diammonium phosphates, trivalent iron phosphate or manganese ammonium phosphate ($NH_4MnPO_4$), $MnHPO_4$, $Fe_2P_2O_7$. The person skilled in the art will be able to select any alternative suitable source compound d) or any from the above without departing from the invention.

In one non-limiting embodiment, the source compound e) is a compound of silicon selected, for example, from organosilicon, silicon alkoxides, tetraethyl orthosilicate, nanosized $SiO_2$, $Li_2SiO_3$, $Li_4SiO_4$ or a mixture thereof. The person skilled in the art will be able to select any alternative suitable source compound e) or any from the above without departing from the invention.

In one non-limiting embodiment, a subset or all of the source compounds a) to e) can also be additionally a source of oxygen and/or a source of at least two elements.

The person skilled in the art will be able to determine the ratios required for each of the source compound depending on the desired alkali metal oxyanion cathode material without departing from the invention.

The deposition of carbon on the surface of the alkali metal oxyanion or its precursors is obtained by pyrolysis of the source compound of carbon f). The deposition of carbon at the surface of the oxyanion or its precursors can be obtained by thermal decomposition or transformation of highly varied source compounds of carbon. In one non-limiting embodiment, the source compound of carbon is a compound which is in the liquid state or in the gas state, a compound which can be used in the form of a solution in liquid solvent, or a compound which changes to the liquid or gas state during its thermal decomposition or transformation, so as to more or less coat the compounds in the mixture. The source compound of carbon can, for example, be chosen from liquid, solid or gaseous hydrocarbons and their derivatives (in particular polycyclic aromatic entities, such as tar or pitch), perylene and its derivatives, polyhydric compounds (for example, sugars and carbohydrates, and their derivatives), polymers, cellulose, starch and their esters and ethers, fatty acid salts (for example stearic, oleic acid or lithium stearate), fatty acid esters, fatty alcohol esters, alkoxylated alcohols, alkoxylated amines, fatty alcohol sulfate or phosphate esters, imidazolium and quaternary ammonium salts, ethylene oxide/propylene oxide copolymer, ethylene oxide/butylene oxide copolymer and their mixtures. Mention may be made, as examples of polymers, of polyolefins, polybutadienes, polyvinyl alcohol, condensation products of phenols (including those obtained from reaction with aldehydes), polymers derived from furfuryl alcohol, from styrene, from divinylbenzene, from naphthalene, from perylene, from acrylonitrile and from vinyl acetate. A non-limiting example is Unithox™ 550 ethoxylate (Baker Hughes). Unithox™ ethoxylates are nonionic emulsifiers and wetting agents with high molecular weights and melt points. These Baker Petrolite ethoxylated products are produced from Unilin™ alcohols which are fully saturated, long chain, linear, $C_{20}$ to $C_{50}$, synthetic alcohols. The person skilled in the art will be able to select any alternative suitable source compound of carbon or any from the above without departing from the invention.

In one non-limiting embodiment, at least a portion of the herein described process is performed under an inert atmosphere such as, without any limitation, nitrogen, argon, and/or helium. In one non-limiting embodiment, at least a portion of the herein described thermal step is performed under a humidified atmosphere, for example as described in WO 2011/072397.

In one non-limiting embodiment, at least a portion of the herein described process is performed under a reductive atmosphere which participates in the reduction and/or prevents the oxidation of the oxidation state of at least one metal in the precursors without full reduction to an elemental state. For example, the reductive atmosphere can be present during the herein described high-energy milling step, thermal step, or any subsequent steps.

In one non-limiting embodiment, the reductive atmosphere is, but without being limited thereto, an externally applied reductive atmosphere, a reductive atmosphere derived from the degradation of a source compound, or a reductive atmosphere derived from the synthesis reaction.

In one non-limiting embodiment, the above externally applied reductive atmosphere comprises a gas such as, but without being limited thereto, CO, $H_2$, $NH_3$, HC, and any combinations thereof, which participates in the reduction or prevents the oxidation of the oxidation state of at least one metal in the precursors without full reduction to an elemental state and where HC refers to any hydrocarbon or carbonaceous product in gas or vapor form. The externally applied reductive atmosphere can also comprise an inert gas such as, but without being limited thereto, $CO_2$, $N_2$, argon, helium, nitrogen or other inert gases.

In one non-limiting embodiment, the above reductive atmosphere derived from the degradation of a source compound is, but without being limited thereto, a reductive atmosphere which is produced when the source compound is degraded or is transformed during a thermal step.

In one non-limiting embodiment, this compound is a reducing agent source which is degraded or is transformed during the thermal step and produces a reductive atmosphere which participates in the reduction or prevents the oxidation of the oxidation state of at least one metal in the precursors without full reduction to an elemental state. In one non-limiting embodiment, this reductive atmosphere comprises CO, $CO/CO_2$, $H_2$, or any combinations thereof.

In one non-limiting embodiment, the above reductive atmosphere derived from the synthesis reaction is, but without being limited thereto, a reductive atmosphere that is produced during the herein described thermal step, and which participates in the reduction or prevents the oxidation of the oxidation state of at least one metal in the precursors without full reduction to an elemental state. In one non-limiting embodiment, this reductive atmosphere comprises CO, $CO/CO_2$, $H_2$ or any combinations thereof.

In one non-limiting embodiment, the herein described cathode material may comprise, at its surface and/or in the bulk, additives, such as, but without any limitation: carbon particles, carbon fibers and nanofibers, carbon nanotubes, graphene, vapor growth conductive fiber (VGCF), metallic oxides, and any mixtures thereof. Those additives could be in any form including spherical (granular) form, flaky form, a fibrous form and the like. Those additives may be incorporated into the herein described process at any step.

As used herein, "strong agglomerates" refer to known structures in the art of ceramics which have been described, for instance, in Tomasi et al., Cerâmica vol. 44 n. 289 São Paulo September/October 1998, which shows the effect of high-energy milling on the agglomeration state of powders. Strength of agglomerates may be characterized by methods such as compaction, or ultrasonic dispersion. Characterization of yttrria powders agglomerates strength by ultrasonic dispersion has been described e.g. in Am. Cer. Soc. Bull., 65, 1591, 1986, for example in FIG. 2 disclosed therein. In one non-limiting embodiment, the ultrasonic dispersion comprises adding 0.3 g of powder in a 100 ml beaker, then 3 ml of Triton X-100 followed by 60 ml of deionized water, then applying an ultrasonic dispersion energy for 30 s with a Sonic and Materials VCX 130 ultrasonic generator (power 130 W, frequency 20 kHz) equipped with an ultrasonic tip model CV18. In such non-limiting embodiment, "strong agglomerates" are agglomerates that when subjected to the ultrasonic dispersion treatment above show a reduction of $D_{50}$ of no more than 50-fold, preferably of no more than 30-fold, more preferably of no more than 20-fold, even more preferably of no more than 10-fold.

In the non-limiting embodiment of a phosphosilicate-based cathode material, the electrochemical performance thereof can be optimized by optimizing the precursors' ratios. While the present inventors noticed that a possible resulting theoretical chemical formula may slightly depart from theoretical electroneutrality, without being bond by any theory, it is believed that the herein described phosphosilicate-based cathode material may contain different phases that may balance out the material overall charge in order to ultimately obtain overall electroneutrality. Hence, the herein described phosphosilicate-based cathode material is not limited to any defined theoretical chemical formula since the person skilled in the art will understand how to optimize the precursors' ratios in order to obtain the desired phosphosilicate-based cathode material without departing from the invention.

As used herein, "general formula" means that the stoichiometry of the cathode material can vary by a few percents from stoichiometry due, for example but without being limited thereto, to substitution or other defects present in the material structure, including anti-sites structural defects such as, without any limitation, cation disorder between iron and lithium in cathode material crystal, see for example Maier et al. [Defect Chemistry of $LiFePO_4$, Journal of the Electrochemical Society, 155, 4, A339-A344, 2008] and Nazar et al. [Proof of Supervalent Doping in Olivine $LiFePO_4$, Chemistry of Materials, 2008, 20 (20), 6313-6315].

In one non-limiting embodiment, the herein described cathode material is an alkali metal oxyanion cathode material comprising particles, where the particles carry, on at least a portion of the particle surface, carbon deposit by pyrolysis.

In one non-limiting embodiment, the herein described particles have the general formula $A:M:M':XO_4$ where the average valency of M is +2 or greater; A is at least one alkali metal selected from Li, Na and K; M is at least Fe and/or Mn; and M' is a metal of valency of 2+ or more. Optionally, the Fe and/or Mn is substituted by at most 15% at. of one or more metal at oxidation levels between +1 and +5.

In one non-limiting embodiment, the elements in the general formula $A:M:M':XO_4$ have the following general ratios 1:0.95-0.98:0.02 to <0.05:1.

In one non-limiting embodiment, the herein described $XO_4$ is $PO_4$ and/or $SiO_4$, and can be partly substituted by another $XO_4$, in which X is either P, S, V, Si, Nb, Mo or any combinations thereof.

In one non-limiting embodiment, the herein described $XO_4$ comprises $PO_4$ and $SiO_4$ and the elements in the resulting general formula $A:M:M':PO_4:SiO_4$ have the following general ratios 1:0.95-0.98:0.02 to <0.05:p:s, where the ratio "s" is equal to the ratio of M' and where the ratio "p" is equal to (1−"s").

In another non-limiting embodiment, the herein described particles have the general formula $A_zM_{1-x}M'_xP_{1-y}Si_yO_4$ where the average valency of M is +2 or greater; where A is at least one alkali metal selected from Li, Na and K; M is at least Fe and/or Mn; and M' is a metal of valency of 2+ or more. Optionally, the Fe and/or Mn is substituted by at most 15% at. of one or more metal at oxidation levels between +1 and +5. The x, y and z are defined as follows: $0.8<z\leq1.2$; $0.02\leq x<0.05$; and y=x·(valency of M'−2)+(1−x)·(average valency of M−2). In one non-limiting embodiment, z is: $0.9\leq z\leq1.1$. In another non-limiting embodiment, z is: $0.95\leq z\leq1.05$. In yet another non-limiting embodiment, z is: $0.97\leq z\leq1.03$. In yet another non-limiting embodiment, z is: $0.98\leq z\leq1.02$.

In one non-limiting embodiment, the herein described M' is selected from Zr, Ti, Nb, Mo, Ge, Ce, Sn, Al, Y, Ga, Cr, V, Ta, Zn and Ca.

In one non-limiting embodiment, the herein described particles have the general formula $Li:(Fe+Zr):PO_4:SiO_4$ in ratios of about 1:1:0.7 to <1:> 0 to 0.3 ratios.

In another non-limiting embodiment, the herein described particles have the general formula $Li:Fe:Zr:PO_4:SiO_4$ in ratios of about 1+/−e:>0.95 to ≤0.98+/−e:from 0.02 to <0.05+/−e:>0.95 to ≤0.98+/−e:0.05+/−e:from 0.02 to <0.05, where "e" is a variation factor that is independently about 20% of value of the corresponding ratio. In another non-limiting embodiment, "e" is independently about 10%, or about 5%, or about 4%, or about 3%, or about 2% of value of the corresponding ratio.

In yet another non-limiting embodiment, the herein described particles have the general formula $LiM_{1-x}M'_x(PO_4)_{1-x}(SiO_4)_x$ where M is at least Fe and/or Mn, and M' is 4+ metal. Optionally, the phosphate polyanion ($PO_4$) can also be partly substituted by sulfate polyanion ($SO_4$) and/or the lithium metal can be partly substituted by Na and/or K, and where $0.02\leq x<0.05$.

In yet another non-limiting embodiment, the herein described the particles have the general formula $LiFe_{1-x}M'_x(PO_4)_{1-x}(SiO_4)_x$, where M' is a 4+ metal. Optionally, the phosphate polyanion ($PO_4$) can also be partly substituted by sulfate polyanion ($SO_4$) and/or the lithium metal can be partly substituted by Na and/or K, and where $0.02 \leq x < 0.05$.

In yet another non-limiting embodiment, the herein described particles have the general formula $AM_{1-x}M'_x(XO_4)_{1-x}(SiO_4)_x$, where:
A is Li, alone or partially replaced by at most 30% as atoms of Na and/or K;
M is a metal comprising at least 90% at. of Fe(II) or Mn(II) or a mixture thereof, and at most 10% at. of one or more metal at oxidation levels between +1 and +5;
M' is a 4+ valency metal comprising at least one of $Zr^{4+}$, $Ti^{4+}$, $Nb^{4+}$, $Mo^{4+}$, $Ge^{4+}$, $Ce^{4+}$ or $Sn^{4+}$;
$XO_4$ is $PO_4$, alone or partially replaced by at most 30 mol % of $SO_4$; and
$0.02 \leq x < 0.05$.

In yet another non-limiting embodiment, the herein described particles have the general formula $AM_{1-x}M'_x(XO_4)_{1-x}(SiO_4)_x$, where:
A is Li, alone or partially replaced by at most 10% as atoms of Na or K;
M is a metal comprising at least 90% at. of Fe(II) or Mn(II) or a mixture thereof, and at most:
I. 10% as atoms of Ni and/or Co;
II. 10% as atoms of one or more aliovalent or isovalent metals other than Ni or Co;
III. 10% as atoms of Fe(III); or
IV. any combinations of I. to III.;
M' is a 4+ valency metal comprising at least one of $Zr^{4+}$, $Ti^{4+}$, $Nb^{4+}$, $Mo^{4+}$, $Ge^{4+}$, $Ce^{4+}$ or $Sn^{4+}$;
$XO_4$ is $PO_4$, alone or partially replaced by at most 10 mol % of $SO_4$; and
$0.02 \leq x < 0.05$.

In yet another non-limiting embodiment, the herein described particles have the general formula $AM_{1-x}M'_x(XO_4)_{1-x}(SiO_4)_x$, where:
A is Li;
M is Fe(II);
M' is a 4+ valency metal comprising at least one of $Zr^{4+}$, $Ti^{4+}$, $Nb^{4+}$, $Mo^{4+}$, $Ge^{4+}$, $Ce^{4+}$ or $Sn^{4+}$;
$XO_4$ is $PO_4$; and
$0.02 \leq x < 0.05$.

In yet another non-limiting embodiment, the herein described particles have the general formula $AM_{1-x}M'_x(XO_4)_{1-x}(SiO_4)_x$, where:
A is Li;
M is Fe(II);
M' is $Zr^{4+}$;
$XO_4$ is $PO_4$; and
$0.02 \leq x < 0.05$.

In yet another non-limiting embodiment, the herein described particles have the general formula $LiFe_{1-x}Zr_x(PO_4)_{1-x}(SiO_4)_x$ where $0.02 \leq x < 0.05$, or $0.02 \leq x \leq 0.04$, or $0.02 \leq x \leq 0.03$.

In yet another non-limiting embodiment, the herein described particles have the general formula $LiFe_{0.975}Zr_{0.025}(PO_4)_{0.975}(SiO_4)_{0.025}$.

In yet another non-limiting embodiment, the herein described particles have the general formula $LiM_{1-x}M'_x(PO_4)_{1-x}(SiO_4)_x$ where M is at least Fe and/or Mn, and M' is 3+ metal. Optionally, the phosphate polyanion ($PO_4$) can also be partly substituted by sulfate polyanion ($SO_4$) and/or the lithium metal can be partly substituted by Na and/or K.

In yet another non-limiting embodiment, the herein described particles have the general formula $LiFe_{1-x}M'_x(PO_4)_{1-x}(SiO_4)_x$, where M' is a 3+ metal. Optionally, the phosphate polyanion ($PO_4$) can also be partly substituted by sulfate polyanion ($SO_4$) and/or the lithium metal can be partly substituted by Na and/or K.

In yet another non-limiting embodiment, the herein described particles have the general formula $AM_{1-x}M'_x(XO_4)_{1-x}(SiO_4)_x$, where:
A is Li, alone or partially replaced by at most 30% as atoms of Na and/or K;
M is a metal comprising at least 90% at. of Fe(II) or Mn(II) or a mixture thereof, and at most 10% at. of one or more metal at oxidation levels between +1 and +5;
M' is a 3+ valency metal comprising at least one of $Al^{3+}$, $Y^{3+}$, $Nb^{3+}$, $Ti^{3+}$, $Ga^{3+}$, $Cr^{3+}$ or $V^{3+}$;
$XO_4$ is $PO_4$, alone or partially replaced by at most 30 mol % of $SO_4$; and
$0.02 \leq x < 0.05$.

In yet another non-limiting embodiment, the herein described particles have the general formula $AM_{1-x}M'_x(XO_4)_{1-x}(SiO_4)_x$, where:
A is Li, alone or partially replaced by at most 10% as atoms of Na or K;
M is a metal comprising at least 90% at. of Fe(II) or Mn(II) or a mixture thereof, and at most:
I. 10% as atoms of Ni and/or Co;
II. 10% as atoms of one or more aliovalent or isovalent metals other than Ni or Co;
III. 10% as atoms of Fe(III); or
IV. any combinations of I. to III.;
M' is a 3+ valency metal comprising at least one of $Al^{3+}$, $Y^{3+}$, $Nb^{3+}$, $Ti^{3+}$, $Ga^{3+}$, $Cr^{3+}$ or $V^{3+}$;
$XO_4$ is $PO_4$, alone or partially replaced by at most 10 mol % of $SO_4$; and
$0.02 \leq x < 0.05$.

In yet another non-limiting embodiment, the herein described particles have the general formula $AM_{1-x}M'_x(XO_4)_{1-x}(SiO_4)_x$, where:
A is Li;
M is Fe(II);
M' is a 3+ valency metal comprising at least one of $Al^{3+}$, $Y^{3+}$, $Nb^{3+}$, $Ti^{3+}$, $Ga^{3+}$, $Cr^{3+}$ or $V^{3+}$;
$XO_4$ is $PO_4$; and
$0.02 \leq x < 0.05$.

In yet another non-limiting embodiment, the herein described particles have the general formula $AM_{1-x}M'_x(XO_4)_{1-x}(SiO_4)_x$, where:
A is Li;
M is Fe(II);
M' is $Y^{3+}$ or $Al^{3+}$;
$XO_4$ is $PO_4$; and
$0.02 \leq x < 0.05$.

In yet another non-limiting embodiment, the herein described particles have the general formula $LiFe_{1-x}M'_x(PO_4)_{1-x}(SiO_4)_x$, where M' is $Y^{3+}$ and/or $Al^{3+}$, and $0.02 \leq x < 0.05$, or $0.02 \leq x \leq 0.04$, or $0.02 \leq x \leq 0.03$.

In yet another non-limiting embodiment, the herein described particles have the general formula $LiFe_{0.95}M'_{0.05}(PO_4)_{0.95}(SiO_4)_{0.05}$, where M' is $Y^{3+}$ and/or $Al^{3+}$.

EXAMPLES

Example 1: Synthesis of $Fe_2P_2O_7$ by Hydrogen Reduction of $FePO_4$ 30 kg of $FePO_4 \cdot 2H_2O$ (sold by Budenheim, grade E53-81) were fed into a rotary kiln and heated up to 700° C. and maintained at that temperature for 2 hours to produce $Fe_2P_2O_7$. The kiln was continuously flushed with a hydrogen/nitrogen mixture throughout the duration of the thermal step (5% hydrogen in nitrogen gas mix).

Example 2: Synthesis of C—$Fe_2P_2O_7$

A mixture comprising 30 kg of $FePO_4.2H_2O$ (sold by Budenheim, grade E53-81) and 1.5 kg of polyethylene-block-poly(ethylene glycol) comprising 50% of ethylene oxide (sold by Sigma-Aldrich) was mixed in a plow mixer for 30 min (sold by Littleford Day, Inc., USA). The mixture was introduced in a rotary kiln and heated up to 500° C. and maintained at that temperature for 2 hours to produce carbon-deposited $Fe_2P_2O_7$ (C—$Fe_2P_2O_7$). The kiln was continuously flushed with nitrogen throughout the duration of the thermal step.

Example 3: Synthesis of $Fe_2P_2O_7$ from $FeC_2O_4$ and $NH_4H_2PO_4$ $Fe_2P_2O_7$ was prepared by a solid-state reaction using iron oxalate and ammonium dihydrogen phosphate as described by Hu and al. (Journal of Central South University of Technology, (2008), 15, pages 531-534). Iron oxalate (1 mole) and $NH_4H_2PO_4$ (1 mole) were mixed and milled in a planetary mill at a speed of 300 r/min for 4 hours in acetone resulting in a slurry. The slurry was then dried at 80° C. and the resulting dried mixture was heated at 650° C. under argon, for a time sufficient to produce $Fe_2P_2O_7$ with a particle size distribution ranging from 0.45 to 3.3 μm.

Example 3': Synthesis of C—$Fe_2P_2O_7$ from $FeC_2O_4$ and $NH_4H_2PO_4$ and an Organic Source The solid-state reaction of example 3 was repeated under identical conditions but with the addition of 10 wt. % of micronized polyethylene wax powders (sold by Marcus Oil & Chemical, grade M 5005, average particle size of 5 μm) to the $Fe_2C_2O_4/NH_4H_2PO_4$ precursors prior to the mixing step in the planetary mill. The thermal step produced carbon-deposited $Fe_2P_2O_7$ (C—$Fe_2P_2O_7$).

The solid-state reaction of example 3 was also repeated under identical conditions but with the addition of 10 wt. % polyvinyl alcohol (sold by Sigma-Aldrich) to the $Fe_2C_2O_4/NH_4H_2PO_4$ precursors prior to the mixing step in the planetary mill. The thermal step produced carbon-deposited $Fe_2P_2O_7$ (C—$Fe_2P_2O_7$).

Example 4: Synthesis of $Fe_2P_2O_7$ from $Fe_2O_3$ and $NH_4H_2PO_4$ $Fe_2P_2O_7$ was prepared by a solid-state reaction using iron oxide and ammonium dihydrogen phosphate as described by Xiao and al (Chinese Chemical Letters, (2007), 18, pages 1525-1527). $Fe_2O_3$ (1 mole) and $NH_4H_2PO_4$ (2 moles) were mixed and ball milled for 4 hours in ethanol resulting in a slurry. The slurry was then dried at 80° C. A thermal step of the resulting dried mixture was performed for 6 hours at 700° C. under argon, to produce $Fe_2P_2O_7$ with a particle size distribution ranging from 0.53 to 2.4 μm.

This solid-state reaction was repeated under identical conditions but replacing 1 mole $Fe_2O_3$ by 2 moles FeOOH (sold by Lanxess, Germany), to produce $Fe_2P_2O_7$.

Example 4': Synthesis of C—$Fe_2P_2O_7$ from $Fe_2O_3$ and $NH_4H_2PO_4$ and an Organic Source The solid-state reaction of example 4 was repeated under identical conditions but with the addition of 10 wt. % lactose (sold by Sigma-Aldrich) to the $Fe_2O_3/NH_4H_2PO_4$ precursors prior to the mixing step in the planetary mill. The thermal step produced carbon-deposited $Fe_2P_2O_7$ (C—$Fe_2P_2O_7$).

The solid-state reaction of example 4 was also repeated under identical conditions but with the addition of 5 wt. % polyethylene-block-poly(ethylene glycol) comprising 50% of ethylene oxide (sold by Sigma-Aldrich) and 5 wt. % lactose (sold by Sigma-Aldrich) to the $Fe_2O_3/NH_4H_2PO_4$ precursors prior to the mixing step in the planetary mill. The thermal step produced carbon-deposited $Fe_2P_2O_7$ (C—$Fe_2P_2O_7$).

Example 5: Synthesis of $Fe_2P_2O_7$ from FeO and $P_2O_5$ $Fe_2P_2O_7$ was prepared by a solid-state reaction using iron(II) oxide and phosphorus pentoxide. FeO (2 moles, sold by Sigma-Aldrich) was ball milled with $P_2O_5$ (1 mole, sold by Sigma-Aldrich) at ambient temperature for 60 min to produce $Fe_2P_2O_7$.

Example 6: Synthesis of Carbon Coated Lithium Iron Zirconium Silicophosphate 699.0 g C—$Fe_2P_2O_7$, as prepared in example 2, 191.9 g $Li_2CO_3$ (sold by Quadra Chemicals), 55.1 g zirconium(IV) acetate hydroxide (sold by Sigma-Aldrich), 54.1 g tetraethyl orthosilicate $Si(OC_2H_5)_4$ (sold by Dow Corning), 20 g stearic acid (sold by Sigma-Aldrich), 20 g of micronized polyethylene wax powders (sold by Marcus Oil & Chemical, grade M 5005, average particle size of 5 μm), and 30 g of lactose (sold by Sigma-Aldrich) were charged in an high-energy ball milling vertical agitation attritor (Union Process 1-S, process vessel size of 7 liters) containing 10 kg of yttrium-stabilized $ZrO_2$ beads (10 mm diameter) as milling media. The attritor was then operated during 30 minutes at a speed of 450 rpm. Strong agglomerates of precursors were obtained after attrition.

In an airtight container, placed into a furnace having a gas inlet and outlet, milled materials in a ceramic crucible were heated up to 600° C. at a heating rate of 40° C./minute, the thermal step was performed at this temperature for 2 hours. The airtight container was continuously flushed with nitrogen gas (ml/mn ?), previously bubbled in a water/isopropanol solution (1:1 in volume) at 55° C., throughout the duration of the thermal step. The product was then cooled in the airtight container to ambient temperature while being flushed under dry nitrogen.

The X-ray spectrum of the resulting olivine structure lithium iron zirconium phosphosilicate (LMPS-1) shows a unit cell volume of 290.937 Å$^3$ and no clear formation of impurity phase. The carbon content was 2.37 wt. % (determined using a LECO apparatus) and BET was 19.99 m$^2$/g (determined using a Micromeritics Tristar 3020a).

The reaction of example 6 was repeated under identical conditions but using 1 kg of $Fe_2P_2O_7$, as prepared in example 3, $Li_2CO_3$, zirconium(IV) acetate hydroxide, and tetraethyl orthosilicate in a molar ratio of Li:Fe:Zr:P:Si=1: 0.95:0.05:0.95:0.05, 20 g stearic acid, 20 g micronized polyethylene wax powders (sold by Marcus Oil & Chemical, grade M 5005, average particle size of 5 μm) and 30 g lactose. Similar results were obtained as those of the first experiment.

The reaction of example 6 was repeated under identical conditions but partly replacing $Li_2CO_3$ by $Na_2CO_3$, using 1 kg of $Fe_2P_2O_7$, $Li_2CO_3$, $Na_2CO_3$, zirconium(IV) acetate hydroxide, and tetraethyl orthosilicate in a molar ratio of Li:Na:Fe:Zr:P:Si=0.9:0.1:0.95:0.05:0.95:0.05, 20 g stearic acid, 20 g micronized polyethylene wax powders (sold by Marcus Oil & Chemical, grade M 5005, average particle size of 5 μm) and 30 g lactose.

The reaction of example 6 was repeated under identical conditions but replacing $Li_2CO_3$ by $Na_2CO_3$, using 1 kg $Fe_2P_2O_7$, $Na_2CO_3$, zirconium(IV) acetate hydroxide, and tetraethyl orthosilicate in a molar ratio of Na:Fe:Zr:P:Si=1: 0.95:0.05:0.95:0.05, 20 g stearic acid, 20 g micronized polyethylene wax powders (sold by Marcus Oil & Chemical, grade M 5005, average particle size of 5 μm) and 30 g lactose.

The reaction of example 6 was repeated under identical conditions but partly replacing $Fe_2P_2O_7$ by $Mn_2P_2O_7.3H_2O$ (sold by Pfaltz & Bauer, USA), using 1 kg $Fe_2P_2O_7$, $Mn_2P_2O_7.3H_2O$, $Li_2CO_3$, zirconium(IV) acetate hydroxide, and tetraethyl orthosilicate in a molar ratio of Li:Fe:Mn:Zr:P:Si=1:0.90:0.05:0.05:0.95:0.05, 20 g stearic acid, 20 g micronized polyethylene wax powders (sold by Marcus Oil & Chemical, grade M 5005, average particle size of 5 μm) and 30 g lactose.

The reaction of example 6 was repeated under identical conditions but partly replacing $Fe_2P_2O_7$ by $Mn_2P_2O_7.3H_2O$ (sold by Pfaltz & Bauer, USA), using 1 kg $Fe_2P_2O_7$, $Mn_2P_2O_7.3H_2O$, $Li_2CO_3$, zirconium(IV) acetate hydroxide, and tetraethyl orthosilicate in a molar ratio of Li:Fe:Mn:Zr:P:Si=1:0.475:0.475:0.05:0.95:0.05, 20 g stearic acid, 20 g micronized polyethylene wax powders (sold by Marcus Oil & Chemical, grade M 5005, average particle size of 5 μm) and 30 g lactose.

The reaction of example 6 was repeated under identical conditions but replacing $Fe_2P_2O_7$ by $Mn_2P_2O_7.3H_2O$ (sold by Pfaltz & Bauer, USA), using 1 kg $Mn_2P_2O_7.3H_2O$, $Li_2CO_3$, zirconium(IV) acetate hydroxide, and tetraethyl orthosilicate in a molar ratio of Li:Mn:Zr:P:Si=1:0.95:0.05:0.95:0.05, 20 g stearic acid, 20 g micronized polyethylene wax powders (sold by Marcus Oil & Chemical, grade M 5005, average particle size of 5 μm) and 30 g lactose.

The reaction of example 6 was repeated under identical conditions but partly replacing $Fe_2P_2O_7$ by $Mn_2P_2O_7.3H_2O$ (sold by Pfaltz & Bauer, USA) and $Mg_2P_2O_7$ (sold by Alfa Aesar, USA), using 1 kg $Fe_2P_2O_7$, $Mn_2P_2O_7.3H_2O$, $Mg_2P_2O_7$, $Li_2CO_3$, zirconium(IV) acetate hydroxide, and tetraethyl orthosilicate in a molar ratio of Li:Fe:Mn:Mg:Zr:P:Si=1:0.7:0.2:0.05:0.05:0.95:0.05, 20 g stearic acid, 20 g micronized polyethylene wax powders (sold by Marcus Oil & Chemical, grade M 5005, average particle size of 5 μm) and 30 g lactose.

The reaction of example 6 was repeated under identical conditions but partly replacing $Fe_2P_2O_7$ by $Mg_2P_2O_7$ (sold by Alfa Aesar, USA), using 1 kg $Fe_2P_2O_7$, $Mg_2P_2O_7$, $Li_2CO_3$, zirconium(IV) acetate hydroxide, and tetraethyl orthosilicate in a molar ratio of Li:Fe:Mg:Zr:P:Si=1:0.92:0.03:0.05:0.95:0.05, 20 g stearic acid, 20 g micronized polyethylene wax powders (sold by Marcus Oil & Chemical, grade M 5005, average particle size of 5 μm) and 30 g lactose.

Example 7: Synthesis of Carbon Coated Lithium Iron Zirconium Silicophosphate The reaction of example 6 was repeated under identical conditions, except that the nitrogen gas was bubbled in isopropanol only instead of a water/isopropanol solution.

The X-ray spectrum of the resulting olivine structure lithium iron zirconium phosphosilicate (LMPS-2) shows a unit cell volume of 290.893 Å$^3$ and no clear formation of impurity phase. The carbon content was 2.76 wt. % (determined using a LECO apparatus) and BET was 19.62 m$^2$/g (determined using a Micromeritics Tristar 3020a).

Example 8: Synthesis of Carbon Coated Lithium Iron Zirconium Silicophosphate The reaction of example 6 was repeated under identical conditions, except that the nitrogen gas was bubbled in water only instead of a water/isopropanol solution and that the 600° C. temperature was maintained for 6 hours instead of 2 hours.

The X-ray spectrum of the resulting olivine structure lithium iron zirconium phosphosilicate (LMPS-3) and shows a unit cell volume of 290.840 Å$^3$ and no clear formation of impurity phase. The carbon content was 1.37 wt. % (determined using a LECO apparatus) and BET was 21.2 m$^2$/g (determined using a Micromeritics Tristar 3020a).

A scanning electron microscopy (SEM) image of as-synthesized LMPS-3 shows the form of large strong agglomerates of submicron carbon-deposited lithium iron zirconium phosphosilicate.

Example 9: Synthesis of Carbon Coated Lithium Iron Zirconium Silicophosphate The experiment of example 6 has been repeated in similar conditions, except that the airtight container was flushed with dry nitrogen during the thermal step and that the 600° C. temperature was maintained for 6 hours instead of 2 hours.

The X-ray spectrum of the resulting product (LMPS-4) shows an olivine structure lithium iron zirconium phosphosilicate main phase with a unit cell volume of 290.928 Å$^3$, with $LiZr_2(PO_4)_3$, $ZrO_2$ and $Li_3PO_4$ impurity phases. The carbon content was 1.69 wt. % (determined using a LECO apparatus) and BET was 18.9 m$^2$/g (determined using a Micromeritics Tristar 3020a).

Example 10: Synthesis of Carbon Coated Lithium Iron Zirconium Silicophosphate FeO (sold by Reade Advanced Materials) and $P_2O_5$ (sold by Sigma-Aldrich) were charged in a high-energy ball milling vertical agitation attritor (Union Process 1-S, process vessel size of 7 liters) containing 10 kg of yttrium-stabilized $ZrO_2$ beads (10 mm diameter) as milling media. The attritor was then operated under argon during 45 min at a speed of 350 rpm.

Then, $Li_2CO_3$ (sold by Quadra Chemicals), zirconium (IV) acetate hydroxide (sold by Sigma-Aldrich), tetraethyl orthosilicate $Si(OC_2H_5)_4$ (sold by Dow Corning), 20 g stearic acid (sold by Sigma-Aldrich), 20 g of micronized polyethylene wax powders (sold by Marcus Oil & Chemical, grade M 5005, average particle size of 5 μm), and 30 g of lactose (sold by Sigma-Aldrich) were further charged in attritor. The attritor was then operated during 30 min at a speed of 300 rpm.

Fe, P, Li, Zr and Si sources quantities are such to obtain 1 kg of FeO, $P_2O_5$, $Li_2CO_3$, zirconium(IV) acetate hydroxide, and tetraethyl orthosilicate mixture in a molar ratio of Li:Fe:Zr:P:Si=1:0.95:0.05:0.95:0.05.

In an airtight container, placed into a furnace having a gas inlet and outlet, milled materials in a ceramic crucible were heated up to 600° C. at a heating rate of 40° C./min, the thermal step was performed at this temperature for 2 hours. The airtight container was continuously flushed with nitrogen gas (ml/mn ?), previously bubbled in a water/isopropanol solution (1:1 in volume) at 55° C., throughout the duration of the thermal step. The lithium iron zirconium phosphosilicate product was then cooled in the airtight container to ambient temperature while being flushed under dry nitrogen.

Example 11: Synthesis of Carbon Coated Lithium Iron Zirconium Silicophosphate $NH_4FePO_4.H_2O$ was prepared by mixing ascorbic acid, $FeSO_4.7H_2O$ (sold by Sigma-Aldrich), $H_3PO_4$ (85 wt. % in $H_2O$, sold by Fisher) and $NH_3.H_2O$ (28-30 wt. % in water) in a 0.1:1:1:3 molar ratio. The solid residue was filtered off and washed with water and acetone, then dried in a vacuum oven at 60° C. for 3 hours.

As prepared $NH_4FePO_4.H_2O$, $Li_2CO_3$ (sold by Quadra Chemicals), zirconium(IV) acetate hydroxide (sold by Sigma-Aldrich), tetraethyl orthosilicate $Si(OC_2H_5)_4$ (sold by Dow Corning), 20 g stearic acid (sold by Sigma-Aldrich), 20 g of micronized polyethylene wax powders (sold by Marcus Oil & Chemical, grade M 5005, average particle size of 5 µm), and 30 g of lactose (sold by Sigma-Aldrich) were charged in an high-energy ball milling vertical agitation attritor (Union Process 1-S, process vessel size of 7 liters) containing 10 kg of yttrium-stabilized $ZrO_2$ beads (10 mm diameter) as milling media. The attritor was then operated during 30 min at a speed of 350 rpm. Strong agglomerates of precursors were obtained after attrition.

Fe, P, Li, Zr and Si sources quantities are such to obtain 1 kg of $NH_4FePO_4.H_2O$, $Li_2CO_3$, zirconium(IV) acetate hydroxide, and tetraethyl orthosilicate mixture in a molar ratio of Li:Fe:Zr:P:Si=1:0.95:0.05:0.95:0.05.

In an airtight container, placed into a furnace having a gas inlet and outlet, milled materials in a ceramic crucible were heated up to 600° C. at a heating rate of 40° C./min, the thermal step was performed at this temperature for 2 hours. The airtight container was continuously flushed with nitrogen gas (ml/mn ?), previously bubbled in a water/isopropanol solution (1:1 in volume) at 55° C., throughout the duration of the thermal step. The lithium iron zirconium phosphosilicate product was then cooled in the airtight container to ambient temperature while being flushed under dry nitrogen.

Example 12: Synthesis of Carbon Coated Lithium Iron Phosphate 795 g C—$Fe_2P_2O_7$, as prepared in example 2, 205 g $Li_2CO_3$ (sold by Quadra Chemicals), 20 g stearic acid (sold by Sigma-Aldrich), 20 g of micronized polyethylene wax powders (sold by Marcus Oil & Chemical, grade M 5005, average particle size of 5 µm) were charged in an high-energy ball milling vertical agitation attritor (Union Process 1-S, process vessel size of 7 liters) containing 10 kg of yttrium-stabilized $ZrO_2$ beads (10 mm diameter) as milling media. The attritor was then operated during 30 min at a speed of 300 rpm. Strong agglomerates of precursors were obtained after attrition.

In an airtight container, placed into a furnace having a gas inlet and outlet, milled materials in a ceramic crucible were heated at 700° C., the thermal step was performed at this temperature for 1 hour. The airtight container was continuously flushed with nitrogen gas, previously bubbled in a water/isopropanol solution (1:1 in volume) at 55° C., throughout the duration of the thermal step. The product was then cooled in the airtight container to ambient temperature while being flushed under dry nitrogen.

The X-ray spectrum of the resulting olivine structure lithium iron phosphate has shown a pure olivine phase. The carbon content was 2.069 wt. % (determined using a LECO apparatus) and BET was 11.93 m²/g (determined using a Micromeritics Tristar 3020a).

This reaction was repeated under identical conditions, except that the airtight container was flushed with dry nitrogen instead of $N_2/H_2O/IPA$ during the thermal step. The carbon content was 1.58 wt. % (determined using a LECO apparatus) and BET was 14.1 m²/g (determined using a Micromeritics Tristar 3020a).

Example 13: Synthesis of Carbon Coated Lithium Iron Phosphate 100 g $LiFePO_4$ made by hydrothermal precipitation, as disclosed in WO 05/05184, and 10 g lactose (sold by Sigma-Aldrich) dissolved in 30 g distilled water were mixed, and then dried under stirring.

In an airtight container, placed into a furnace having a gas inlet and outlet, $LiFePO_4$/lactose materials in a ceramic crucible were heated at 700° C., and the thermal step was performed for 1 hour. The airtight container was continuously flushed with nitrogen gas, previously bubbled in a water/isopropanol solution (1:1 in volume) at 55° C., throughout the duration of the thermal step. The product was then cooled in the airtight container to ambient temperature while being flushed under dry nitrogen.

The carbon content was 2.925 wt. % (determined using a LECO apparatus) and BET was 8.93 m²/g (determined using a Micromeritics Tristar 3020a).

This reaction was repeated under identical conditions, except that the airtight container was flushed with dry nitrogen instead of $N_2/H_2O/IPA$ during the thermal step. The carbon content was 2.058 wt. % (determined using a LECO apparatus) and BET was 14.1 m²/g (determined using a Micromeritics Tristar 3020a).

Example 14: Synthesis of Carbon Coated Lithium Iron Phosphate 795 g $Fe_2P_2O_7$, as prepared in example 1, 205 g $Li_2CO_3$ (sold by Quadra Chemicals), 20 g stearic acid (sold by Sigma-Aldrich), 20 g of micronized polyethylene wax powders (sold by Marcus Oil & Chemical, grade M 5005, average particle size of 5 µm) were charged in an high-energy ball milling vertical agitation attritor (Union Process 1-S, process vessel size of 7 liters) containing 10 kg of yttrium-stabilized $ZrO_2$ beads (10 mm diameter) as milling media. The attritor was then operated during 30 min at a speed of 300 rpm. Strong agglomerates of precursors were obtained after attrition.

In an airtight container, placed into a furnace having a gas inlet and outlet, milled materials in a ceramic crucible were heated at 700° C., and the thermal step was performed for 1 hour. The airtight container was continuously flushed with nitrogen gas, previously bubbled in a water/isopropanol solution (1:1 in volume) at 55° C., throughout the duration of the thermal step. The product was then cooled in the airtight container to ambient temperature while being flushed under dry nitrogen.

The X-ray spectrum of the resulting olivine structure lithium iron phosphate has shown a pure olivine phase. The carbon content was 1.86 wt. % (determined using a LECO apparatus) and BET was 10.82 m$^2$/g (determined using a Micromeritics Tristar 3020a).

This reaction was repeated under identical conditions, except that the airtight container was flushed with dry nitrogen instead of $N_2/H_2O$/IPA during the heat treatment. The carbon content was 1.36 wt. % (determined using a LECO apparatus) and BET was 13.1 m$^2$/g (determined using a Micromeritics Tristar 3020a).

Example 15: Retreatment of Carbon Coated Lithium Iron Phosphate

In an airtight container, placed into a furnace having a gas inlet and outlet, 100 g carbon coated LiFePO$_4$ (Life Power® P1 produced by Phostech Lithium) materials in a ceramic crucible were heated at 700° C., and the thermal step was performed for 3 hours. The airtight container was continuously flushed with nitrogen gas, previously bubbled in isopropanol at 55° C., throughout the duration of the thermal step. The product was then cooled in the airtight container to ambient temperature while being flushed under dry nitrogen.

The carbon content was 3.06 wt. % (determined using a LECO apparatus) and BET was 9.57 m$^2$/g (determined using a Micromeritics Tristar 3020a).

This reaction was repeated under identical conditions, except that the airtight container was flushed with $N_2/H_2O$/IPA ($N_2$ previously bubbled in a water/isopropanol solution, 1:1 in volume) instead of $N_2$/IPA during the heat treatment. The carbon content was 2.8 wt. % (determined using a LECO apparatus) and BET was 9.86 m$^2$/g (determined using a Micromeritics Tristar 3020a).

The first reaction was repeated under identical conditions, except that the airtight container was flushed with $N_2/H_2O$ ($N_2$ previously bubbled in water) instead of $N_2$/IPA during the heat treatment. The carbon content was 1.29 wt. % (determined using a LECO apparatus) and BET was 15.3 m$^2$/g (determined using a Micromeritics Tristar 3020a).

Example 16: Synthesis of $LiZr_{0.0175}Fe_{0.09825}(PO_4)_{0.965}(SiO_4)_{0.035}$ and $LiZr_{0.025}Fe_{0.975}(PO_4)_{0.975}(SiO_4)_{0.025}$ $LiZr_{0.0175}Fe_{0.09825}(PO_4)_{0.965}(SiO_4)_{0.035}$ material was synthesized, 749.12 g of $Fe_2P_2O_7$, 17.02 g of iron oxalate, 199.79 g of $Li_2CO_3$, 20 g of Zr acetate-OH, 13.91 g of silicon oil, 20 g of stearic acid, 20 g of marcus and 30 g of lactose were mixed and attrition milled in 1S for 30 min.

In an airtight container, placed into a rotary kiln having a gas inlet and outlet, milled materials in a ceramic crucible were heated at 650° C., and the thermal step was performed for 3 h. The airtight container was continuously flushed with moisturized Nitrogen ($N_2/H_2O$) throughout the duration of the thermal step. The product was then cooled in the airtight container to ambient temperature while being flushed under nitrogen. The material obtained has an olivine structure and shows an electrochemical capacity of 149 mAh/g. This reaction was repeated under identical conditions, but the precursors were adjusted to make $LiZr_{0.325}Fe_{3.975}(PO_4)_{3.975}(SiO_4)_{0.025}$. This material shows an electrochemical capacity of 152 mAh/g.

Example 17: Preparation of Liquid Electrolyte Batteries

Liquid electrolyte batteries were prepared according to the following procedure.

In each case, a cathode material described herein, HFP-VF$_2$ copolymer (Kynar® HSV 900, supplied by Atochem) and an EBN-1010 graphite powder (supplied by Superior Graphite) were ball milled in a jar mill with zirconia beads in N-methyl-pyrrolidone (NMP) for 10 hours in order to prepare a slurry comprising a cathode material with battery grade particle size distribution, and to obtain a dispersion composed of the cathode material/HFP-VF$_2$/graphite in a ratio of 80/10/10 by total weight. The dispersion obtained was subsequently deposited, using a Gardner® device, on a sheet of aluminum carrying a carbon-treated coating (supplied by Exopack Advanced Coating) and the deposited film was dried under vacuum at 80° C. for 24 hours and then stored in a glovebox.

Batteries of the "button" type were assembled and sealed in a glovebox, use being made of the carbon-treated sheet of aluminum carrying the coating comprising the herein described cathode material as battery cathode, a film of lithium as anode, and a separator having a thickness of 25 μm (supplied by Celgard) impregnated with a 1M solution of LiPF$_6$ in an EC/DEC 3/7 mixture.

The batteries were subjected to scanning cyclic voltammetry at ambient temperature with a rate of 20 mV/80 s using a VMP2 multichannel potentiostat (Biologic Science Instruments), first in oxydation from the rest potential up to $V_{max}$ V and then in reduction between $V_{max}$ and $V_{min}$ V. Voltammetry was repeated a second time and nominal capacity of the cathode material (in mAh/g) determined from the second reduction cycle. Nominal capacities obtains for the different cathode tested are provided in the following table:

| Battery cathode | $V_{min}$ | $V_{max}$ | C (mAh/g) |
|---|---|---|---|
| LMPS-1 | 2.2 | 3.7 | |
| LMPS-2 | 2.2 | 3.7 | |
| LMPS-4 | 2.2 | 3.7 | |

Similar batteries were also tested with intensiostatic discharge between $V_{max}$ and $V_{min}$ V at various rate of C/t, t representing time to fully discharge nominal capacity (for example C/10 for a discharge in 10 hours or 10 C for a discharge in 6 mn) at ambient temperature. Similar batteries were also tested, at ambient temperature, with intensiostatic discharge between $V_{max}$ and $V_{min}$ V at various rate of discharge, providing cathode material capacity (mAh/g) depending on rate of discharge (C-rate) for LMPS-1 cathode material.

Similar batteries were also tested, at ambient temperature and 60° C., with intensiostatic discharge between $V_{max}$ and $V_{min}$ V to evaluate cycling capability.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps. It will also be understood by those of skill in the art that the transitional phrase "consisting essentially of" limits the scope of a claim to the specified materials or steps and those that do not materially affect the basic and novel characteristic(s) of the claimed invention.

Although the present invention has been described in considerable detail with reference to certain embodiments thereof, variations and refinements are possible without departing from the invention. While the compositions and methods of this invention have been described in terms of preferred embodiments, it is apparent to those of skill in the art that variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

All references cited throughout the specification are hereby incorporated herein by reference in their entirety.

The invention claimed is:

1. A process for making an alkali metal oxyanion cathode material comprising particles, where the particles carry, on at least a portion of the particle surface, a carbon coating deposited by pyrolysis, and wherein the particles have the general formula:

$$A_1M_{(0.95\ to\ 0.98)}M'_{(0.02\ to\ <0.05)}(PO_4)_p(SiO_4)_s$$

wherein
A is at least one alkali metal selected from the group consisting of Li, Na and K;
M is at least Fe and/or Mn, wherein the average valence of M is +2 or greater, and wherein M can be substituted by at most 15% at. of one or more metal at oxidation levels between +1 and +5;
M' is a metal of valence of 2+ or more; and
wherein s is equal to the stoichiometric index of M' and p is equal to (1−s);
said process comprising:
performing a high-energy milling step of precursors of the alkali metal oxyanion cathode material, wherein an organic source of carbon is also present during the high-energy milling step, and wherein no further high-energy milling step is performed after the thermal step; and
performing a thermal step of the high-energy milled precursors of the alkali metal oxyanion cathode material, wherein at least a part of the thermal step is performed under an atmosphere comprising a carbonaceous chemical and/or an organic chemical comprising carbon.

2. The process according to claim 1, further comprising performing a flash pyrolysis to obtain the carbon coating.

3. The process according to claim 1, wherein an organic source of carbon is present in the precursors to obtain the carbon coating and pyrolysis is performed during the thermal step.

4. The process according to claim 1, wherein M' comprises Zr.

5. The process according to claim 1, wherein the gaseous or vaporous atmosphere is humidified.

6. The process according to claim 1, wherein the thermal step is performed in a chemical reactor that comprises a zone fed by an external flow of gas and/or vaporous atmosphere comprising a carbonaceous chemical and/or an organic chemical comprising carbon.

7. The process according to claim 1, wherein the carbonaceous chemical comprises a decomposition product of an organic compound comprising carbon.

8. The process according to claim 1, wherein the carbonaceous chemical is a compound having at least 40 wt. % of carbon.

9. The process according to claim 8, wherein the carbonaceous compound is methanol, isopropanol and/or butanol.

10. The process according to claim 1, wherein the precursors comprise:
a) at least one source compound of an alkali metal;
b) at least one source compound of a metal M selected from Fe and/or Mn;
c) at least one source compound of a metal M', where M' in the final product is a 2+ or more metal;
d) at least one source compound of P, if the element P is not present in another source compound;
e) at least one source compound of Si, if the element Si is not present in another source compound; and
f) at least one source compound of carbon.

11. The process according to claim 10, wherein the source compound b) is partially replaced by at most 15% of one or more other metals selected from Ni and Co, and/or by one or more aliovalent or isovalent metals selected from the group consisting of Mg, Mo, Mn, V, Pb, Sn, Nb, Ti, Ai, Ta, Ge, La, Y, Yb, Cu, Ag, Sm, Ce, Hf, Cr, Zr, Bi, Zn, Ca, B and W, and/or atoms of Fe(III).

12. The process according to claim 1, wherein the high-energy milling is a high-energy ball milling or a dry high-energy milling.

13. The process according to claim 1, wherein the thermal step is operated at a temperature selected from the range of temperatures between about 400° C. and about 800° C.

* * * * *